(12) United States Patent
Gardner

(10) Patent No.: US 7,958,845 B2
(45) Date of Patent: Jun. 14, 2011

(54) BOTTLE CAP FOR A BIRD FEEDER

(75) Inventor: Stewart C. Gardner, Mansfield, MA (US)

(73) Assignee: Stewart G. Gardner, Mansfield, MA (US)

( * ) Notice: Subject to any disclaimer, the term of this patent is extended or adjusted under 35 U.S.C. 154(b) by 161 days.

(21) Appl. No.: 12/070,179

(22) Filed: Feb. 15, 2008

(65) Prior Publication Data

US 2009/0205572 A1    Aug. 20, 2009

(51) Int. Cl.
*A01K 39/026* (2006.01)
(52) U.S. Cl. ............................................. 119/77; 119/72
(58) Field of Classification Search ................. 119/52.2, 119/57.8, 51.5, 57.9, 72, 72.5, 74, 77, 71
See application file for complete search history.

(56) References Cited

U.S. PATENT DOCUMENTS

| | | | | |
|---|---|---|---|---|
| 5,303,674 A * | 4/1994 | Hyde, Jr. | | 119/77 |
| 5,423,291 A * | 6/1995 | Daugherty | | 119/77 |
| 6,659,041 B1 * | 12/2003 | Curts | | 119/52.2 |
| 7,275,500 B2 * | 10/2007 | Fort, II | | 119/57.8 |
| D609,862 S * | 2/2010 | Gardner | | D30/124 |
| D609,863 S * | 2/2010 | Gardner | | D30/124 |
| 2007/0289540 A1 * | 12/2007 | Stone et al. | | 119/72 |
| 2008/0190881 A1 * | 8/2008 | Gardner | | 215/243 |
| 2008/0314327 A1 * | 12/2008 | Hepp et al. | | 119/75 |
| 2009/0145875 A1 * | 6/2009 | Gardner | | 215/228 |

* cited by examiner

*Primary Examiner* — Rob Swiatek
*Assistant Examiner* — Kristen C Hayes

(57) ABSTRACT

A bottle cap for fitting on a mouth of a bottle to form a bird feeder is disclosed. The bottle cap comprises a first chamber with a opening for receiving the mouth of the bottle, wherein the bottle cap snaps onto the mouth of the bottle. A second chamber is provided with a closed bottom. A sealing ring is located between the first and second chambers so as to provide a seal between the bottle cap and the mouth of the bottle when the bottle cap is snapped onto the mouth of the bottle, wherein liquid is free to move between the first and second chambers. At least one feeding port is provided in a side wall of the second chamber.

20 Claims, 9 Drawing Sheets

BOTTLE CAP FOR A BIRD FEEDER

FIELD OF THE INVENTION

The present invention relates generally to bird feeders. More particularly, the present invention relates to a bottle cap and a bottle for use as a hummingbird feeder.

BACKGROUND OF THE INVENTION

Millions of people around the world enjoy watching and feeding wild birds. These people love to feed the wild birds in their backyards or on their balconies so that they can enjoy watching the birds. While there are many types of wild birds that people like to watch and feed, the hummingbird is a favorite for many people. Hummingbirds are attracted to sweet nectar produced by flowers. As a substitute for the sweet nectar, people use water sweetened by sugar in hummingbird feeders to attract and feed the hummingbirds.

A typical hummingbird feeder is comprised of a fluid reservoir for holding the sugar water which is conveyed to a plurality of simulated flowers. The hummingbirds insert their long thin beak into holes in the simulated flowers to drink the sugar water. While the sugar water is an effective substitute for natural flower nectar, the use of sweetened water has several drawbacks.

In warm climates, the sweetened water has a tendency to ferment which can quickly lead to the production of bacteria, mold and mildew. The bacteria, mold and mildew will discolor the sweetened water and may begin to grow inside the fluid reservoir. As a result, the hummingbird feeder can quickly turn into an unsightly mess. In addition, the bacteria, mold and mildew can also be harmful and fatal to the hummingbirds. As a result, hummingbird feeders must be cleaned on a regular basis, for example, every three or four days. The constant hassle of cleaning the hummingbird feeder has caused many people to stop using their hummingbird feeders.

Thus, there is a need for a new hummingbird feeder which overcomes the problems cited above.

SUMMARY OF THE INVENTION

It is therefore a feature and advantage of the present invention to provide a hummingbird feeder which requires minimal or no cleaning at all.

According to one aspect of the invention, a bottle cap is provided with at least one feeding port, wherein the bottle cap can be screwed onto a plastic bottle thereby turning most plastic bottles into a hummingbird feeder.

According to another aspect of the invention, a disposable plastic bottle with a cap with at least one feeding port is disclosed which is pre-filled with a nectar to create a hummingbird feeder.

In accordance with one embodiment of the present invention, a bottle cap for fitting on a mouth of a bottle is disclosed. The bottle cap comprises: a first chamber with a opening for receiving the mouth of the bottle, wherein the bottle cap snaps onto the mouth of the bottle; a second chamber with a closed bottom; a sealing ring located between the first and second chambers so as to provide a seal between the bottle cap and the mouth of the bottle when the bottle cap is snapped onto the mouth of the bottle, wherein liquid is free to move between the first and second chambers; and at least one feeding port in a side wall of the second chamber.

In accordance with one embodiment of the present invention, a bird feeder is disclosed. The bird feeder comprises: a fluid reservoir and a mouth; a cap which is attached to the mouth of the fluid reservoir, the cap comprising: a first chamber with a opening for receiving the mouth, wherein the cap snaps onto the mouth of the fluid reservoir; a second chamber with a closed bottom; a sealing ring located between the first and second chambers so as to provide a seal between the cap and the mouth when the cap is snapped onto the mouth, wherein liquid is free to move between the first and second chambers; and at least one feeding port in the wall of the second chamber.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will now be described, by way of example, with reference to the accompanying drawings, wherein.

DETAILED DESCRIPTION OF PREFERRED EMBODIMENTS OF THE INVENTION

According to one embodiment of the invention, a bottle cap is provided with at least one feeding port, wherein the bottle cap can be snapped or screwed onto a plastic or glass bottle thereby turning most bottles into a hummingbird feeder. In this embodiment, when the feeder needs to be cleaned, the bottle is simply thrown away and a new bottle is used. Thus, only the bottle cap needs to be cleaned if not thrown away as well. According to another embodiment of the invention, a disposable plastic bottle with a cap with at least one feeding port is disclosed which is pre-filled with a nectar, such as water mixed with a pure white sugar solution to create a hummingbird feeder. In this embodiment, the entire feeder is disposable and is thrown away when the nectar is gone or the feeder needs to be cleaned. Thus, the hassle of cleaning the feeder is completely eliminated.

Figure 1A:
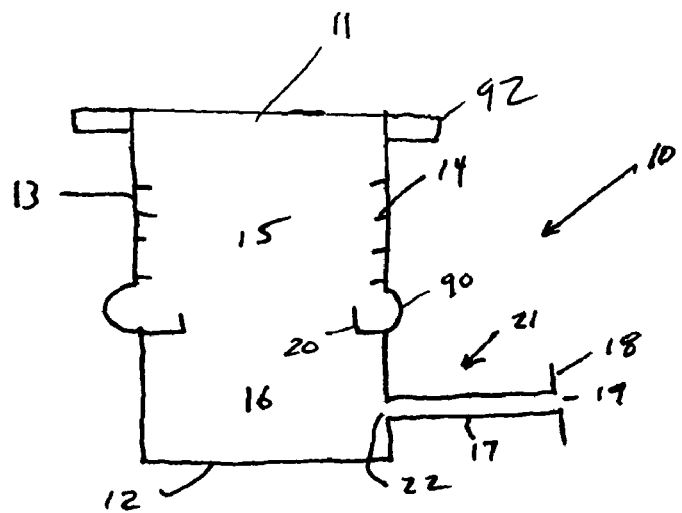
FIGS. 1(a)-1(b) illustrate side views of a bottle cap according to two embodiments of the invention.
Figure 2:
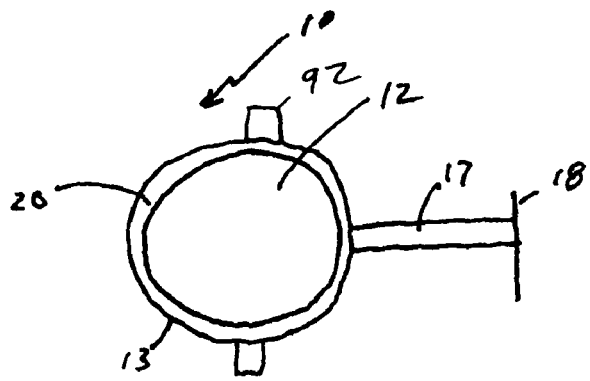
FIG. 2 illustrates a top view of the bottle cap illustrated in FIG. 1 according to one embodiment of the invention.
Figure 1B:
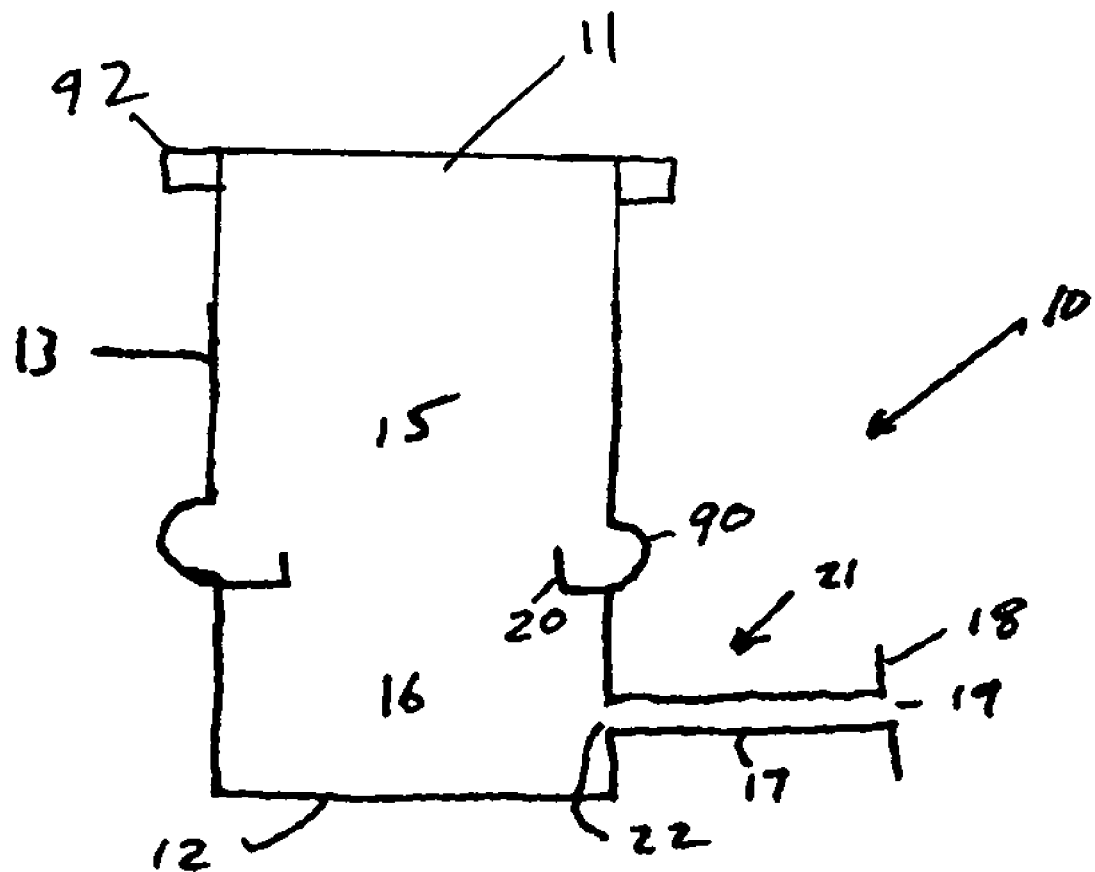

FIG. 1(a) illustrates a side view of a bottle cap 10 according to one embodiment of the invention. The bottle cap 10 comprises an opening 11 and a side wall 13 with threads 14 so as to allow the bottle cap 10 to be screwed onto the mouth of a bottle (not illustrated). In the alternative, the cap 10 may snap onto a threadless mouth of a bottle by forcing the cap 10 onto the mouth of the bottle. To further facilitate the attachment of the cap to a treadles bottle, the cap 10 may have a snap on lip seal 90 for accommodating the protruding lip which is common on the mouth of threadless bottles. Furthermore, the side wall 13 of the cap 10 may be threadless as illustrated in FIG. 1(b). In this embodiment, the cap 10 is snapped onto the mouth of the bottle. The bottle cap 10 has a bottom 12 and a side wall 13. The bottle cap 10 is divided into two fluid chambers 15, 16 by a seal 20. As illustrated in FIG. 2, the seal 20 extends inward from the side wall 13 and continues around the inside of the cap 10. The seal 20 seals the bottle cap 10 to the mouth of the bottle when the bottle cap 10 is snapped or screwed onto mouth of the bottle. The seal 20 and/or the snap on lip seal 90 help to create a partial or complete vacuum in the hummingbird feeder which will be explained in more detail below. According to one embodiment of the invention, the snap on lip seal 90 is located near the bottom of the first chamber 15 so that the mouth of the bottle is in contact with the seal 20 when the cap is snapped or screwed onto the mouth of the bottle, but the invention is not limited thereto. It will be understood by those skilled in the art that fluid is allowed to travel between the two fluid chambers 15, 16 when the bottle cap 10 is attached to the bottle. In this embodiment, the first and second fluid chambers 15, 16 have substantially the same shape but the invention is not limited thereto. For example, the first and second chamber 15, 16 may have very different shapes as will be described in more detail below with reference to FIGS. 6-7. The bottle cap 10 also has hanger tabs 92 on the outside of the side wall 13 for allowing the bottle cap 10 to be held in a proper position if the bottle cap 10 and attached bottle are enclosed in a hanger and cover assembly but the invention is not limited thereto. While the Figures show two hanger tabs 92 on the bottle cap, it will be understood that the bottle cap can have any number of hanger tabs or no hanger tabs and the invention is not limited thereto.

Figure 3:
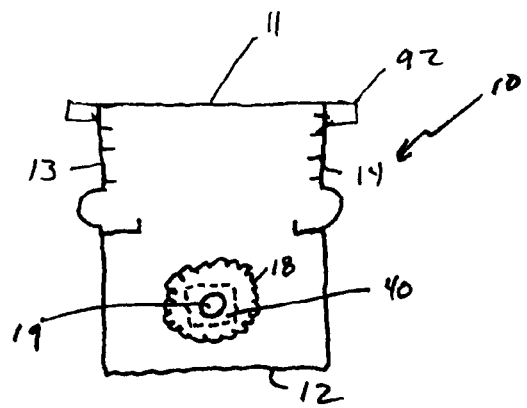
FIG. 3 illustrates a side view of a bottle cap according to one embodiment of the invention.
Figure 16:
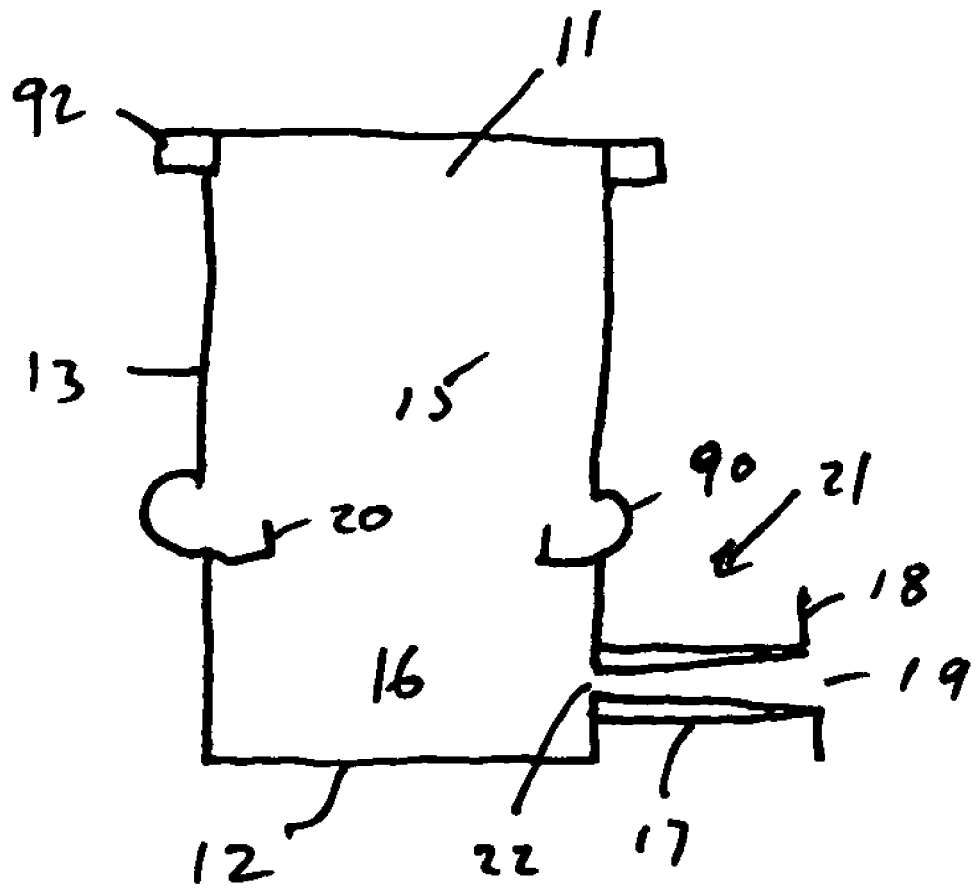
FIG. 16 illustrates a side view of a bottle cap according to one embodiment of the invention.

Returning to FIGS. 1(a)-1(b), the bottle cap 10 has at least one feeding port 21. It will be understood by those skilled in the art that the bottle cap 10 may have any number of feeding ports 21 and the invention is not limited to any specific number. In this embodiment of the invention, each feeding port 21 is comprised of a hollow stem 17, a simulated attractor 18, wherein the simulated attractor 18 has at least one opening 19. As illustrated in FIG. 3, the simulated attractor 18 can have the shape and appearance of a flower but the invention is not limited thereto. The stem 17 is connected to an opening 22 in the side wall 13 of the second chamber 16 so that fluid in the second chamber 16 can pass into the hollow stem 17. The hollow stem 17 has a sufficient width so as to allow a hummingbird to stick his beak through the opening 19 into the hollow stem 17 to drink the nectar. In addition, the hollow stem 17 has a sufficient length, for example, ¼ to ½ of an inch, so as to prevent the nectar from simply flowing out of the opening 19. In other word, the nectar will flow part of the way into the stem 17 and then will stop due to surface tension between the nectar and the walls of the stem 17 and the partial or complete vacuum created in the hummingbird feeder by the seal 20 and/or the snap on lip seal 90. It will be understood by those skilled in the art that the hollow stem 17 can have various lengths depending in part by the diameter of the hollow stem 17 and the invention is not limited thereto. In addition, the inner diameter of the hollow stem may be tapered near the opening 22 and get larger as the stem 17 gets closer to the opening 19, as illustrated in FIG. 16.

Figure 4:
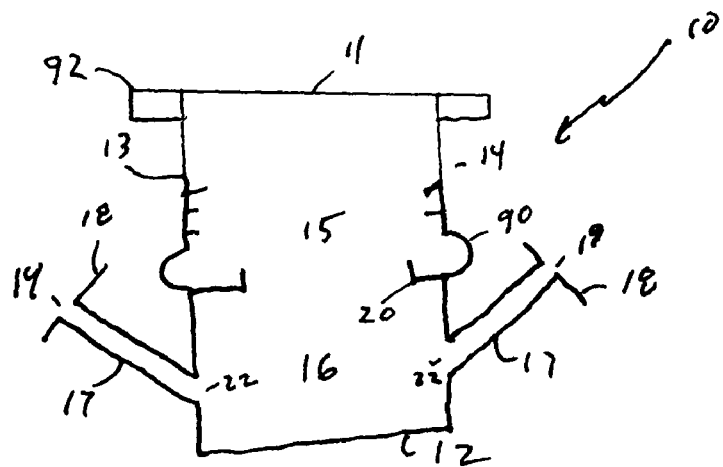
FIG. 4 illustrates a side view of a bottle cap according to another embodiment of the invention.

According to one embodiment of the invention, the hollow stem 17 projects outward from the bottle cap 10 and is substantially parallel to the bottom 12 of the bottle cap 10 as is illustrated in FIGS. 1(a)-1(b). According to another embodiment of the invention illustrated in FIG. 4, the hollow stems 17 can be angled upward from a position parallel to the bottom 12 of the bottle cap 10 so as to help prevent the nectar from leaking out of the openings 19. It will be understood by those skilled in the art that the hollow stems 17 can be angled upward relative to the bottom 12 at any angle and the invention is not limited thereto.

Figure 8:
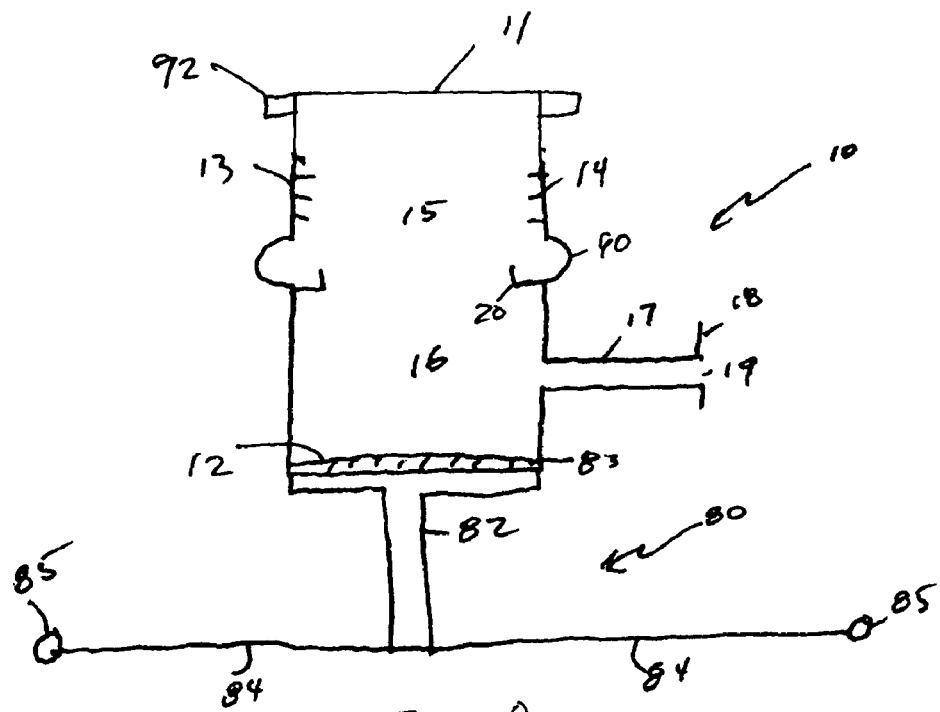
FIG. 8 illustrates a side view of a bottle cap according to another embodiment of the invention.
Figure 9:
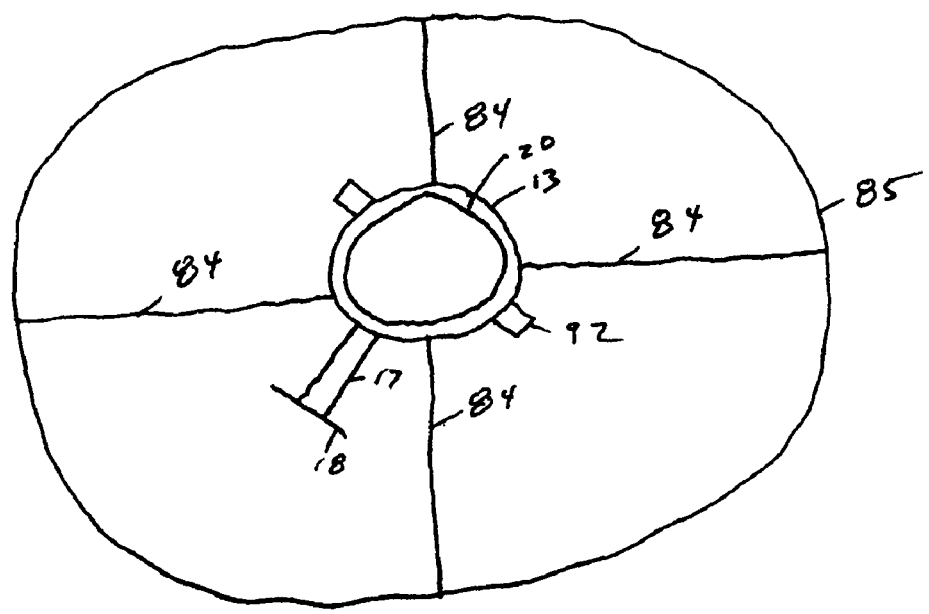
FIG. 9 illustrates a top view of the bottle cap illustrated in FIG. 8 according to one embodiment of the invention.
Figure 10:
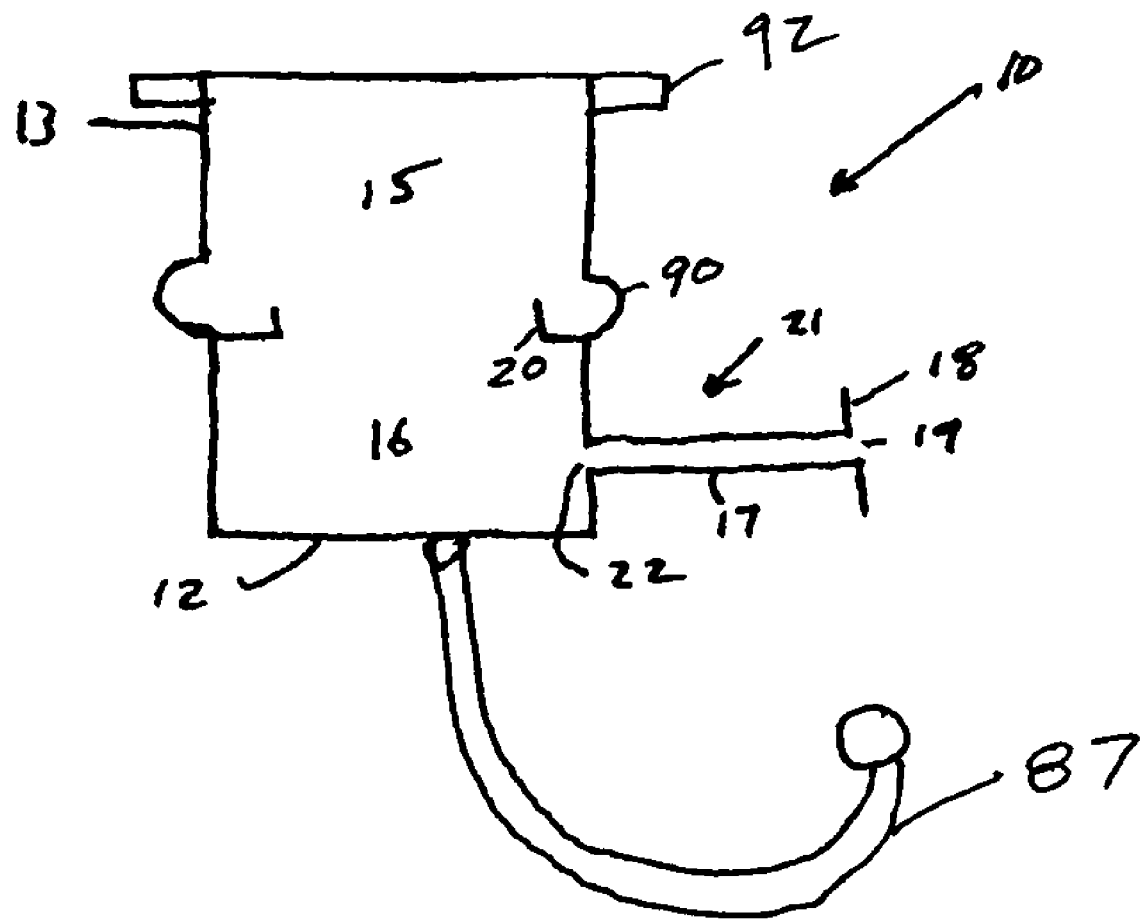
FIG. 10 illustrates a side view of a bottle cap with a single perch according to one embodiment of the invention.

According to another embodiment of the invention, a perch 80 may be connected to the outside of the bottom of the bottle cap 10 as illustrated in FIGS. 8-10. The perch 80 has a hub 82 which extends down from the bottom of the bottle cap 10. A first end of the hub 82 may be connected to the bottom of the bottle cap in a variety of manners, for example, two sided adhesive 83, glue, snap into a groove in the bottom of the bottle cap 10, snap onto studs protruding from the bottom of the bottle cap, etc., and the invention is not limited thereto. The second end of the hub 82 is attached to a plurality of spokes 84 which radiate out from the hub 82. The plurality of spokes 84 support an outer ring 85. In use, birds can stand on the outer ring 85 and access the nectar through the openings 19 in the simulated attractors 18. According to another embodiment of the invention, a single perch 87 may be attached to the bottom of the bottom cap 10 in a variety of ways as illustrated in FIG. 10.

The bottle cap 10 and all of its components are preferably made of plastic or rubber but the invention is not limited thereto. The bottle cap 10 and all of its components may be a single piece of plastic, formed through, for example, an injection and/or blow molding process, or be formed of multiple pieces which are connected together and the invention is not limited thereto.

Figure 5:
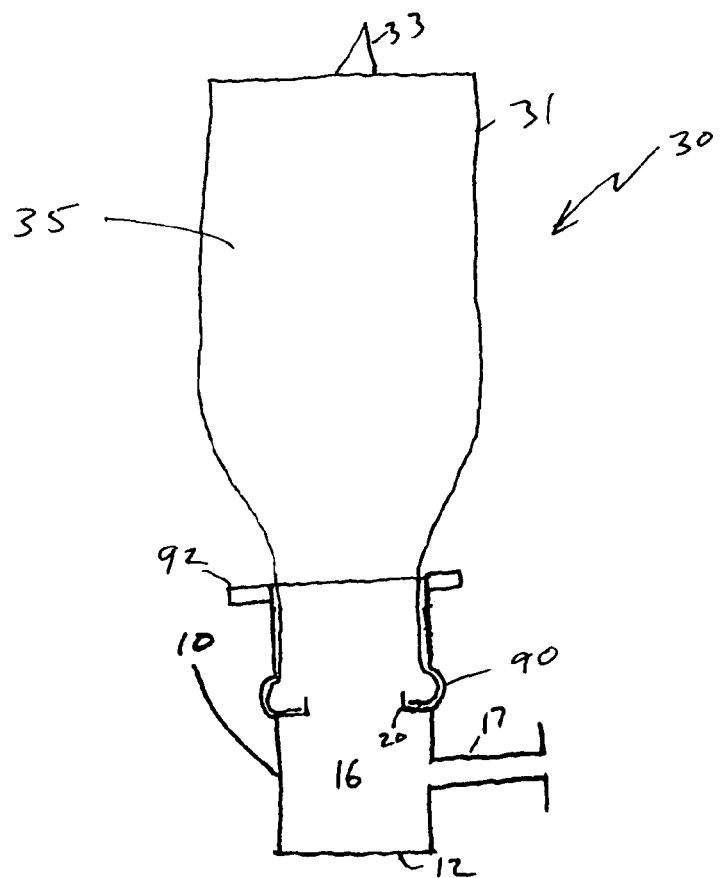
FIG. 5 illustrates a side view of a hummingbird feeder according to another embodiment of the invention.

In use as part of a hummingbird feeder 30, the bottle cap 10 is attached to a bottle 31 which is filled with a nectar 35 as illustrated in FIG. 5. The bottle cap 10 may snap onto the mouth of the bottle and press against the seal 20. In the alternative, the bottle cap 10 can be screwed onto the mouth of the bottle. According to one embodiment of the invention, the bottle cap 10 is reusable and can be attached to any bottle 31 with a standard sized mouth. For example, many commonly used plastic and glass bottles for soda, water, juice, etc., have standard sized mouths and can be used with the bottle cap 10 to form the hummingbird feeder 30. In this embodiment, the user pours the nectar 35 into the bottle 31 and screws or snaps on the bottle cap 10 and hangs the feeder from a hanging device 33. When the nectar is gone, goes bad or the feeder needs to be cleaned, the user can simply remove the cap and throw away the bottle 31. After cleaning the bottle cap 10, the user can fill a different (clean) bottle with the nectar and then attach the bottle cap 10. This invention substantially reduces the amount of time spent cleaning the feeder 30.

Figure 6:
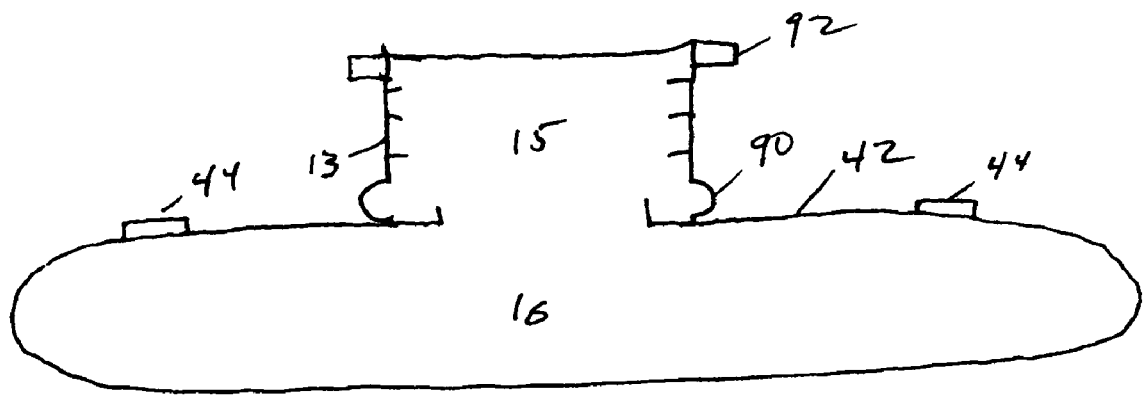
FIG. 6 illustrates a side view of a bottle cap according to another embodiment of the invention.
Figure 7:
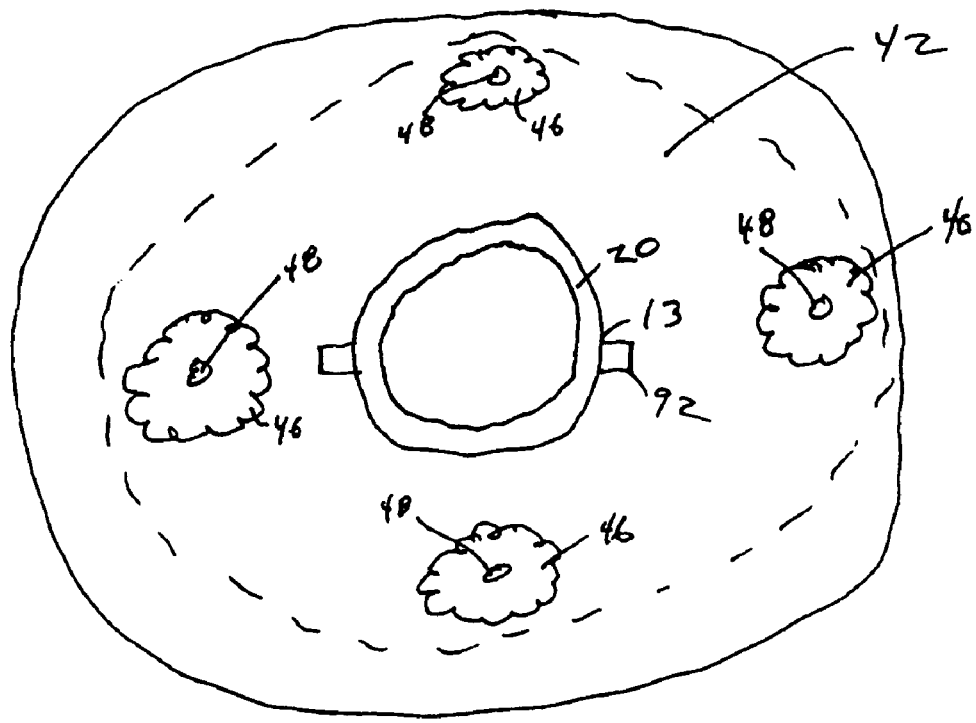
FIG. 7 illustrates a top view of the bottle cap illustrated in FIG. 6 according to one embodiment of the invention.

As mentioned above, the bottle cap 10 may comprise first and second fluid chambers 15, 16 which have different shapes. For example, as illustrated in FIGS. 6-7, the second fluid chamber 16 may have a saucer shape and the invention is not limited thereto. In this embodiment, the saucer shaped fluid chamber 16 has a section 42 with a slight curvature on the top of the fluid chamber 16. The fluid chamber 16 has at least one feeding port 44 located on the section 42. Each feeding port 44 comprises a simulated attractor 46 and an opening 48 and may also comprise a hollow stem.

According to another embodiment of the invention, the feeder 30 with the bottle 31 and the bottle cap 10 can be sold to the user pre-filled with nectar. In this embodiment where the feeder 30 is completely disposable, the feeding ports 21 are sealed by a sealant film or plug 40 to prevent the feeder 30 from leaking prior to use. In use, the feeder 30 may have a hook or loop 33 to which a rope, string or a chain can be attached to allow the feeder 30 to be hung. Alternatively, the feeder 30 may be hung using some other hanging device. In this embodiment, when the feeder 30 needs to be cleaned, the entire feeder 30 is thrown away and a new feeder 30 is then used. Thus, the hassle of cleaning the feeder 30 is completely eliminated.

Figure 11:
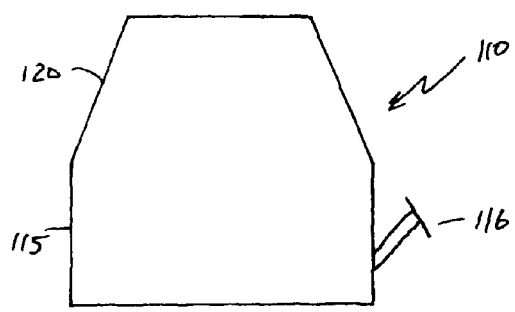
FIG. 11 illustrates a side view of a bottle cap according to another embodiment of the invention.
Figure 14:
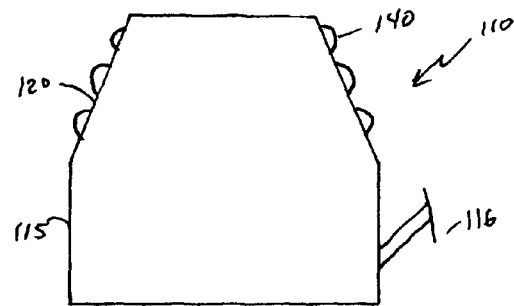
FIG. 14 illustrates a side view of a bottle cap according to another embodiment of the invention.
Figure 13:
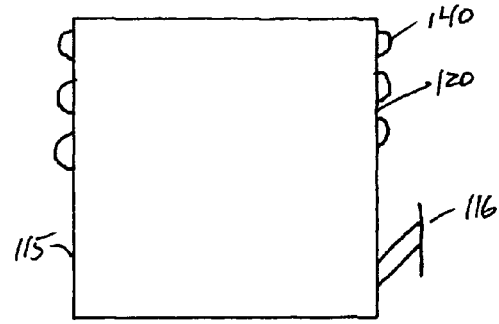
FIG. 13 illustrates a side view of a bottle cap according to another embodiment of the invention.
Figure 12:
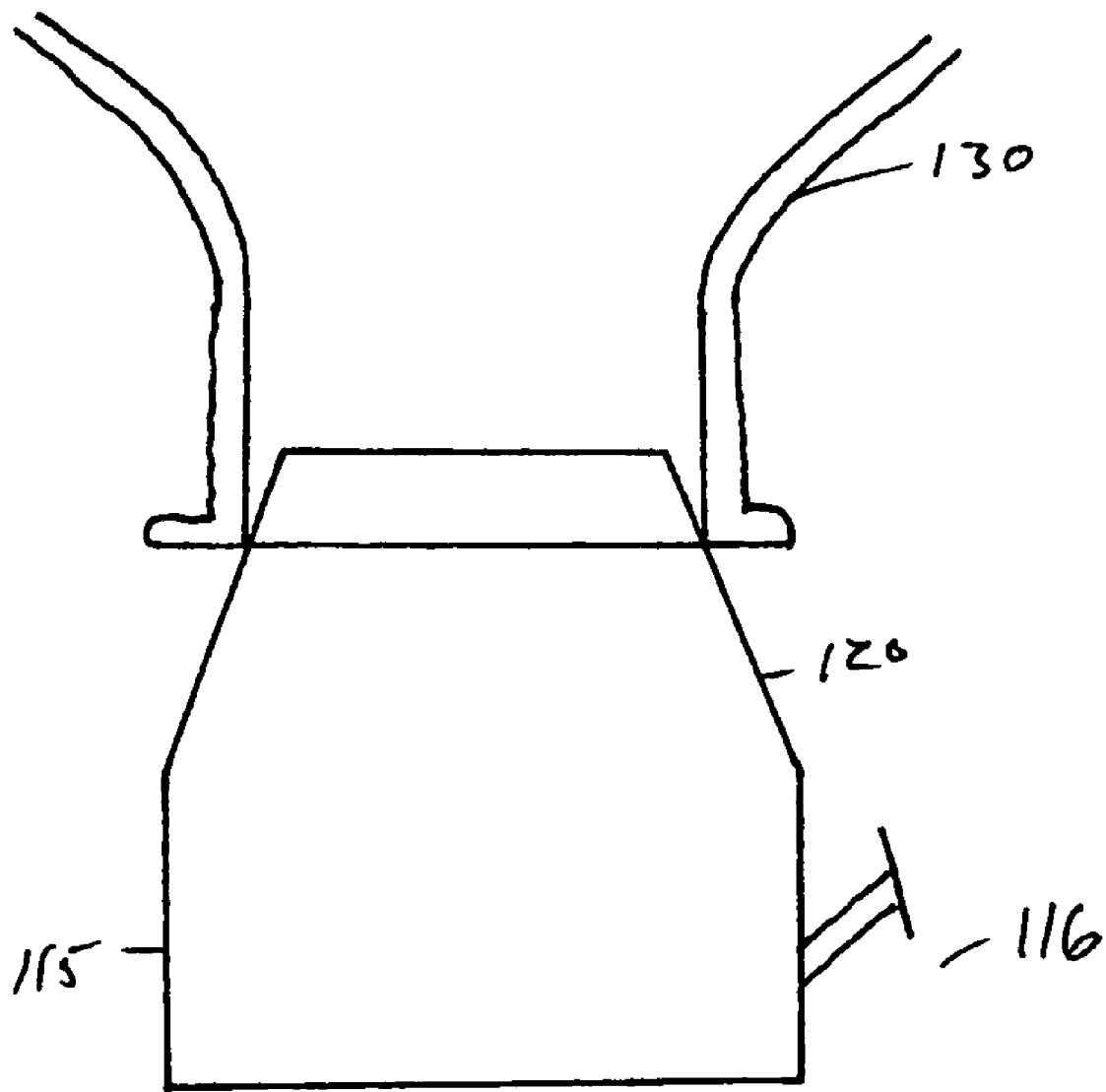
FIG. 12 illustrates a side view of a bottle cap according to another embodiment of the invention.

According to another embodiment of the invention, the bottle cap 110 may have a top section 120 which is shaped and sized like a plug as illustrated in FIG. 11. In this embodiment, the top section 120 is inserted into the mouth of the bottle 130 and securely pressed into place to hold the bottle cap in position via friction as illustrated in FIG. 12. It will be understood by those skilled in the art that the top section 120 is tapered so that the narrow end can be inserted into the mouth of the bottle 130 but the invention is not limited thereto. For example, the top section 120 may have substantially vertical sides with raised ribs 140 on the outside of the top section 120 for helping to secure the bottle cap 110 to the bottle as illustrated in FIG. 13. In addition, the tapered top section 120 may also have raised ribs 140 on the outside of the top section 120 as illustrated in FIG. 14. In these embodiments, the bottle cap 110 is at least partially made of rubber and/or plastic but the invention is not limited thereto.

Figure 15:
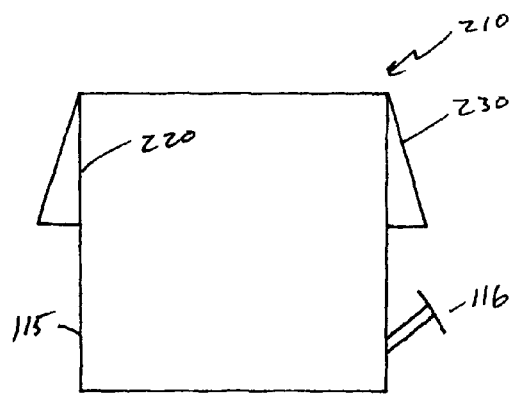
FIG. 15 illustrates a side view of a bottle cap according to another embodiment of the invention.

According to another embodiment of the invention, the top section 220 of the bottle cap 210 may be surrounded by a plug 230 made of rubber, cork, flexible plastic or some other flexible material as illustrated in FIG. 15. In this embodiment, the top section 220 is inserted into the mouth of the bottle until friction between the bottle and the plug 230 holds the bottle cap in place. It will be understood by one skilled in the art that the plug 230 may be tapered and may have raised ribs or the plug may have substantially vertical sides with raised ribs and the invention is not limited thereto.

In the embodiments illustrated in FIGS. 11-15, the lower section of the bottle cap 115 can be configured in the same manner disclosed in FIGS. 1-10 with at least one feeding port 116 which is angled upward towards the top section of the bottle cap. However, the bottle caps illustrated in FIGS. 11-15 do not have a seal between the first section and the second section.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A bottle cap for fitting on a mouth of a bottle, comprising:
    a first chamber with a opening for receiving the mouth of the bottle, wherein the bottle cap snaps onto the mouth of the bottle, wherein at least one hanger tab is located on an outside surface of the first chamber for providing position assistance in a hanger device;
    a second chamber with a closed bottom;
    a sealing ring located between the first and second chambers so as to provide a seal between the bottle cap and the mouth of the bottle when the bottle cap is snapped onto the mouth of the bottle, wherein liquid is free to move between the first and second chambers; and
    at least one feeding port in a side wall of the second chamber.

2. The bottle cap according to claim 1, further comprising:
    a snap on lip seal in a wall of said first chamber for receiving a lip on the mouth of the bottle.

3. The bottle cap according to claim 2, wherein the sealing ring creates at least a vacuum seal to keep the liquid from leaking out of the at least one feeding port.

4. The bottle cap according to claim 1, wherein said bottle cap is made of at least one of plastic and rubber.

5. The bottle cap according to claim 1, wherein the feeding port comprises at least one simulated attractor with at least one opening so as to provide access to liquid in the second chamber.

6. The bottle cap according to claim 5, wherein the feeding port further comprises a hollow stem connected from the second chamber to the simulated attractor so as to allow fluid to move at least a portion of the distance to the opening in the simulated attractor.

7. The bottle cap according to claim 6, wherein the hollow stem is substantially parallel to the bottom of the second chamber.

8. The bottle cap according to claim 6, wherein the hollow stem is angled upward from the bottom of the second chamber.

9. The bottle cap according to claim 6, wherein the hollow stem is tapered near the second chamber.

10. The bottle cap according to claim 6, wherein the hollow stem has sufficient length to keep fluid from flowing out of the opening in the simulated attractor.

11. The bottle cap according to claim 5, wherein the simulated attractor is a simulated flower.

12. The bottle cap according to claim 1, wherein the first and second chambers have substantially the same shape.

13. The bottle cap according to claim 1, wherein the second chamber is larger than the first chamber.

14. The bottle cap according to claim 13, wherein the second chamber is shaped like a saucer.

15. The bottle cap according to claim 14, wherein the at least one feeding port is provided on a top section of the saucer shaped second chamber, wherein said top section of the saucer shaped second chamber has a slight curvature.

16. The bottle cap according to claim 15, wherein the feeding port comprises at least one simulated attractor with at least one opening so as to provide access to liquid in the second chamber.

17. The bottle cap according to claim 1, further comprising: a perch mounted onto the bottom of said bottle cap.

18. A bird feeder, comprising:
a fluid reservoir and a mouth;
a cap which is attached to the mouth of the fluid reservoir, the cap comprising:
a first chamber with a opening for receiving the mouth, wherein the cap snaps onto the mouth of the fluid reservoir, wherein at least one hanger tab is located on an outside surface of the first chamber for providing position assistance in a hanger device;
a second chamber with a closed bottom;
a sealing ring located between the first and second chambers so as to provide a seal between the cap and the mouth when the cap is snapped onto the mouth, wherein liquid is free to move between the first and second chambers; and
at least one feeding port in the wall of the second chamber.

19. The bird feeder according to claim 18, further comprising:
a snap on lip seal in a wall of said first chamber for receiving a lip on the mouth of the bottle.

20. The bird feeder according to claim 19, wherein the sealing ring creates at least a vacuum seal to keep the liquid from leaking out of the at least one feeding port.

* * * * *